(No Model.)

G. S. ARCHER & C. F. BURRINGTON.
ACETYLENE GAS GENERATOR.

No. 577,706. Patented Feb. 23, 1897.

WITNESSES:

INVENTORS,
G. S. Archer
C. F. Burrington
BY
ATTORNEYS.

UNITED STATES PATENT OFFICE.

GUY STEPHENS ARCHER AND CHARLES FAVILLE BURRINGTON, OF CHEROKEE, IOWA.

ACETYLENE-GAS GENERATOR.

SPECIFICATION forming part of Letters Patent No. 577,706, dated February 23, 1897.

Application filed April 15, 1896. Serial No. 587,643. (No model.)

*To all whom it may concern:*

Be it known that we, GUY STEPHENS ARCHER and CHARLES FAVILLE BURRINGTON, of Cherokee, in the county of Cherokee and State of Iowa, have invented a new and Improved Acetylene-Gas Generator, of which the following is a full, clear, and exact description.

The object of the invention is to provide a new and improved acetylene-gas generator which is simple and durable in construction, very effective in operation, and arranged to produce a dry gas to automatically regulate the generation of the gas according to the amount consumed and to maintain a uniform pressure at all times.

The invention consists principally of a tank adapted to contain water and a holder adapted to rise and fall in said water and adapted to support the calcium carbid and move the latter in and out of contact with the water.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in both the figures.

Figure 1:
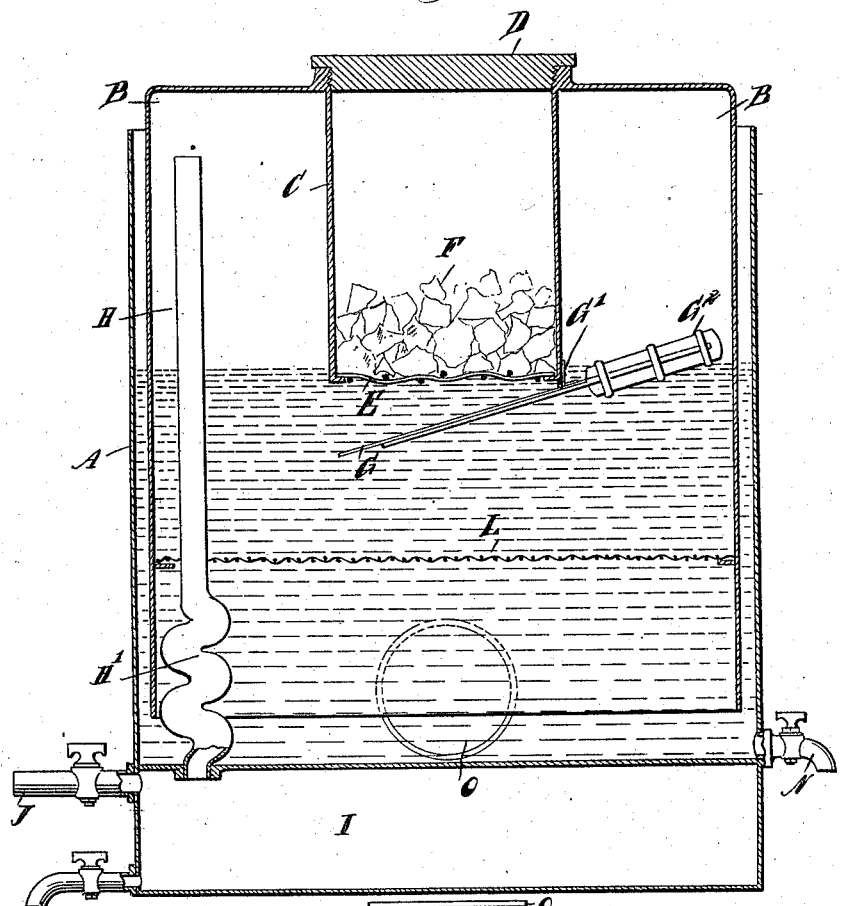
Figure 2:
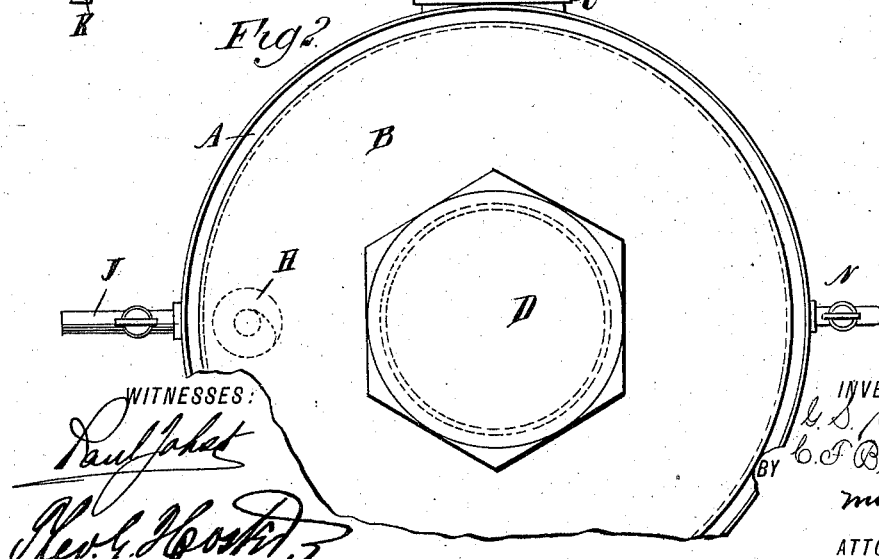

Figure 1 is a sectional side elevation of the improvement, and Fig. 2 is a broken plan view of the same.

The improved generator is provided with a tank A, adapted to contain water, into which extends the lower open end of a holder B, formed with a depending receptacle C, normally closed at the top by a suitable cap D. The bottom E of the receptacle C is perforated and is adapted to support the calcium carbid F for generating the acetylene gas by coming in contact with the water contained in the tank A and extending in the lower part of the holder B. Thus when the holder B moves downward then the calcium carbid F comes in contact with the water, and consequently acetylene gas is generated in the usual manner, the gas passing into the upper part of the holder B. In doing so the gas exerts a pressure in an upward direction on the holder B to lift the said holder and move the calcium carbid out of contact with the water. When this takes place, then the lower end of the receptacle C is closed by a door G, hinged at G' to the lower edge of the receptacle C, said door being weighted by a float $G^2$, which, when out of the water, causes the door G to close; but when the holder B moves downward and the float $G^2$ comes in contact with the water then it causes the door G to open. By this arrangement the saturated acetylene gas is not liable to come in contact with the calcium carbid at the time the holder B is in an uppermost position and the carbid is out of contact with the water, it being understood that the door G is then closed. The gas generated and passing into the upper part of the holder B flows into the upper open end of a pipe H, disposed vertically and formed at its lower end into a coil H', which discharges through the bottom of the tank A into a gas-receiver I, formed on the under side of the tank A.

Now by the arrangement described the gas passing through the pipe H, surrounded by cold water, is cooled, so that when it finally passes into the receiver it is ready for effective use. The receiver I is formed with an outlet-pipe J for carrying the gas to its destination, and from said receiver I leads a draw-off cock K, which when open permits of readily discharging the condensed water from the receiver I.

It is evident that small pieces of calcium carbid may pass through the large meshes of the screen E and drop to the bottom of the tank A and generate a gas which may pass upward through the space between the tank A and the holder B into the room in which the apparatus is located. In order to prevent this, a fine-mesh screen L is provided, held in the holder B a short distance above the lower end thereof, so that the gas generated by pieces of calcium carbid on the screen L rises in the water to the upper end of the holder B.

The tank A is provided with a suitable draw-off cock N for drawing off the water at any time, especially when it is desired to clean the apparatus and to charge the same with fresh water. A manhole O is also provided for removing impurities and other matter settling in the bottom of the tank A, said matter coming from the calcium hydrate and passing through the screen L.

By the arrangement described the holder B automatically rises and falls to move the calcium carbid out of or in contact with the water and to generate the gas in quantities corresponding to the amount of calcium carbid used. The excessive generation of gas in the holder B causes the holder to be lifted sufficiently to separate the calcium carbid and water, whereupon the generation of gas ceases, and when gas is withdrawn from the receiver I the holder B again drops and the operation of generation again takes place. The pressure in the holder B and reservoir I is always equal, owing to the free intercommunication established by the pipe H. When the holder B rises and carries the lower end of the receptacle C out of the water, then the receptacle is automatically closed by the door G to prevent the separated vapors contained in the holder from acting on the calcium carbid F contained in the receptacle C.

When sufficient gas has been withdrawn from the receiver I through the pipe J, then the holder B again sinks to bring the float $G^2$ in engagement with the water and cause the door G to open to make contact between the calcium carbid F and the water and generate acetylene gas. Thus it will be seen that the generation of acetylene gas is automatically regulated by the consumption. The gas leaves the receiver in a comparatively dry state, owing to passing the gas through the air-space in the upper part of the holder B, and the gas is well cooled as it passes through the pipe H into the receiver I. The gas can be shut off for any length of time and no danger result therefrom, as the gas is only generated as required.

Having thus described our invention, we claim as new and desire to secure by Letters Patent—

1. An acetylene-gas generator, comprising a tank adapted to contain water, a holder adapted to fall and rise in said water, a receptacle carried by the holder and having a perforated bottom capable of supporting calcium carbid, and a weighted door pivoted on the lower end of said receptacle, to open and close the same as said holder falls and rises, substantially as shown and described.

2. An apparatus for generating gas having a tank, a receiver below the tank, a pipe communicating with the receiver and passing upwardly into the tank, a bell-shaped holder inverted within the tank and receiving the upper end of the pipe, the holder being capable of movement vertically, a receptacle carried by the holder and located within the same, and a door for the receptacle, the door being capable of closing upon the upward movement of the holder, substantially as described.

GUY STEPHENS ARCHER.
CHARLES FAVILLE BURRINGTON.

Witnesses:
J. T. HOGAN,
B. O. HOLBROOK.